(12) United States Patent
    Asipov et al.

(10) Patent No.: US 8,938,727 B2
(45) Date of Patent: *Jan. 20, 2015

(54) METHOD FOR PREVENTING SOFTWARE REVERSE ENGINEERING, UNAUTHORIZED MODIFICATION, AND RUNTIME DATA INTERCEPTION

(71) Applicant: Microsoft Corporation, Redmond, WA (US)

(72) Inventors: Keren Asipov, Kfar Yona (IL); Boris Asipov, Kfar Yona (IL)

(73) Assignee: Microsoft Corporation, Redmond, WA (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/735,849

(22) Filed: Jan. 7, 2013

(65) Prior Publication Data
US 2013/0125243 A1    May 16, 2013

Related U.S. Application Data

(63) Continuation of application No. 12/063,104, filed as application No. PCT/IL2006/000398 on Mar. 30, 2006, now Pat. No. 8,352,929.

(60) Provisional application No. 60/595,802, filed on Aug. 6, 2005.

(51) Int. Cl.
    *G06F 9/45*      (2006.01)
    *G06F 7/04*      (2006.01)
    (Continued)

(52) U.S. Cl.
    CPC ............ *G06F 21/14* (2013.01); *G06F 9/45504* (2013.01); *G06F 21/125* (2013.01)
    USPC .............. 717/148; 717/140; 717/146; 726/26

(58) Field of Classification Search
    CPC ..... G06F 8/41; G06F 9/45504; G06F 21/125; G06F 21/14
    USPC ................................ 717/139–161; 726/26–33
    See application file for complete search history.

(56) References Cited

U.S. PATENT DOCUMENTS 6,334,189 B1    12/2001    Granger et al.
7,093,119 B2    8/2006    Rhodes
(Continued)

FOREIGN PATENT DOCUMENTS

RU    2137303 C1    9/1999
RU    2183051 C2    5/2002
(Continued)

OTHER PUBLICATIONS

Chinese First Office Action in Application 200680029302.5 mailed Nov. 27, 2009, 13 pages.

(Continued)

*Primary Examiner* — Qing Chen
(74) *Attorney, Agent, or Firm* — Timothy Churna; Kate Drakos; Micky Minhas

(57) ABSTRACT

A method for preventing the unauthorized modification of a software or unauthorized modification of runtime data. According to this method, a converter, which is capable of converting the software into a generalized machine code is provided. The converter is designed such that it cannot he reverse engineered, by using a conversion process that causes data loss. An interpreter, which the knowledge of its process method is kept restricted, is also provided. The interpreter interprets the general machine code into a specific machine code, while reconstructing the lost data during the interpretation process.

19 Claims, 8 Drawing Sheets

(51) Int. Cl.
*G06F 21/14* (2013.01)
*G06F 21/12* (2013.01)
*G06F 9/455* (2006.01)

(56) References Cited

U.S. PATENT DOCUMENTS

| | | |
|---|---|---|
| 7,565,697 B2 | 7/2009 | LeVine et al. |
| 7,779,394 B2 | 8/2010 | Horning et al. |
| 2002/0120854 A1 | 8/2002 | LeVine et al. |
| 2002/0144153 A1 | 10/2002 | LeVine et al. |
| 2004/0003264 A1 | 1/2004 | Zeman et al. |
| 2004/0015710 A1 | 1/2004 | Rhodes |
| 2004/0236955 A1 | 11/2004 | Chow et al. |
| 2004/0267983 A1 | 12/2004 | Oda |
| 2005/0050355 A1 | 3/2005 | Graunke |
| 2005/0183072 A1 | 8/2005 | Horning et al. |
| 2005/0204348 A1 | 9/2005 | Horning et al. |
| 2005/0210275 A1 | 9/2005 | Homing et al. |
| 2010/0313188 A1 | 12/2010 | Asipov et al. |

FOREIGN PATENT DOCUMENTS

| | | | |
|---|---|---|---|
| WO | 96/18951 | A1 | 6/1996 |
| WO | 02/069118 | A2 | 9/2002 |
| WO | 2004/003264 | A1 | 1/2004 |
| WO | 2004/059543 | A2 | 7/2004 |
| WO | 2005/020068 | A2 | 3/2005 |
| WO | 2005/055606 | A1 | 6/2005 |

OTHER PUBLICATIONS

Liu et al., "An Important Step in Software Development—Obfuscation", Journal of Nanjing University of Posts and Telecommunications, Mar. 2004, pp. 59-63, vol. 24, No. 1 (5 pages).
Chinese Second Office Action in Application 200680029302.5 mailed Jun. 15, 2011, 9 pages.
Chinese Notice of Allowance in Application 200680029302.5 mailed Oct. 10, 2011, 4 pages.
Israeli Office Action in Application 189151 mailed Oct. 10, 2011, 5 pages.
Israeli Office Action in Application 189151 mailed Dec. 12, 2012, 10 pages.
Thai et al., "Examining Metadata", .NET Framework Essentials, Aug. 2003, pp. 22-24, 3rd Edition (5 pages).
Russian Notice of Allowance in Application 2008104404/08(004784) mailed Jul. 15, 2011, 18 pages.
PCT International Search Report in Application PCT/IL2006/000398 mailed Jul. 25, 2006, 11 pages.
U.S. Appl. No. 12/063,104, Notice of Allowance mailed Sep. 10, 2012, 17 pages.
Valdez et al., "DISSECT: DIStribution for SECurity Tool," Mar. 15, 2000, Polytechnic University, pp. 1-17 (18 pages).
Naumovich et al., "Preventing Piracy, Reverse Engineering, and Tampering", 2003, IEEE, p. 64-71 (8 pages).
Israeli Office Action (translation) in Application 189151, mailed Apr. 23, 2014, 4 pgs.

METHOD FOR PREVENTING SOFTWARE REVERSE ENGINEERING, UNAUTHORIZED MODIFICATION, AND RUNTIME DATA INTERCEPTION

CROSS-REFERENCE TO RELATED APPLICATIONS

This application is a continuation application of U.S. patent application Ser. No. 12/063,104, filed on Aug. 25, 2010, now U.S. Pat. No. 8,352,929, which is a 371 of International Application Ser. No. PCT/IL2006/000398, filed on Mar. 30, 2006, which claims the benefit of U.S. Provisional Patent Application Ser. No. 60/595,802, filed on Aug. 6, 2005, the entire disclosures of which are hereby incorporated herein by reference.

FIELD OF THE INVENTION

The present invention relates to the field of computer software protection. More particularly, the invention relates to a method for protecting computer software from reverse engineering, unauthorized modification, and runtime data interception.

BACKGROUND OF THE INVENTION

Many attempts have been made in the recent years to protect original computer software from duplication and mass distribution. One of the methods used today involves the requirement of a license or a sequence key, which is entered manually by the customer, during installation or during run time. Another popular method for preventing duplicate usage of software involves the activation of the software after installation. The activation process requires the software to read ID serial numbers of hardware elements in the computer, such as the processor's serial number or graphics card's serial number. Once the hardware ID serial numbers are read, they may be sent together with the software ID number through the Internet to the vendor. The vendor stores the ID numbers and sends a license code to the program through the Internet. The software may be programmed to cease proper function without a verified license code from the vendor. In this case, if the software is illegally copied and installed on a different computer, the software cannot be activated since the software license is already associated with the hardware of the first installation and the license code can only be sent to the computer having the same hardware profiles stored by the vendor. However, these methods do not prevent an unauthorized party from reverse engineering the software code, modifying it to exclude these software protection tools, and mass distributing the modified software.

Many tools are in use today for software reverse engineering, like the hexadecimal dumper, which prints or displays the binary numbers of a software code in hexadecimal format. By knowing the bit patterns that represent these instructions, as well as the instruction lengths, a person who wishes to reverse engineer the software can identify certain portions of a code to see how they work, and then modify them. Another common tool for reverse engineering and code modification is the disassembler. The disassembler reads the binary code and then displays each executable instruction in a textual format. Also, since the disassembler cannot tell the difference between an executable instruction and the data used by the code, a debugger may be used. The debugger allows the disassembler to avoid disassembling the data portions of a code. For example, if the dissembler reads a command "ADD_INT8", which means: "add the number depicted in the next 8 bits", the debugger processes the next 8 bits as the data portion of the command "ADD_INT8", and the next group of bits is processed as a new command. However, these tools relay on the publicized knowledge of how the instructions code is built, where the information resides in the memory, which registers are used, and how the stack (a data buffer used for storing requests that need to be handled, in the form of a push-down list) is used.

The problem of reverse engineering and code modification by unauthorized users is even more apparent when dealing with interpreter-based programming languages, as opposed to compiler based programming languages. A description of compiler-based programming language can be found in FIG. 1, which generally illustrates the prior art software process of compiler-based programming languages, such as C or Pascal. When a programmer programs in a high-level language using an editor or the like, his code's instructions 10, or source code, cannot be read directly by the computer's hardware. Therefore, the source code 10 has to undergo a translation process known as compilation by compiler 11. Compiler 11 compiles source code 10 into a specific Machine Code (MC) 12, which the computer's hardware is able to read and execute. Since the MC 12 is specifically compiled to a certain platform, it cannot be transferred from one platform to another. In the compiler-based programming languages the source code 10 is compiled for each platform individually, producing a different specific MC 12 for each platform. An example of different platforms may be an Intel® based PC with Windows® XP and Mac® OS X.

A description of interpreter-based programming language can be found in FIG. 2a which is a flow chart, generally illustrating the prior art software process of interpreter-based programming languages, such as JAVA. Similar to the compiler based programming languages, the interpreter based languages are written in high level language, using an editor or the like, referred to hereinafter as source statements 20. However, according to this approach, the compiler 21 translates the high level source statements 20 to a Byte Code (BC) 22 which is a generalized MC not limited to a certain platform. Nevertheless, in order to execute the BC 22, a specific interpreter 23 is needed to translate BC 22 into specific MC 24. The specific interpreter 23 is usually installed along with the operating system. The main advantage of this approach is that BC 22 may be distributed for different platforms. Once BC 22 is executed on a certain platform, the specific interpreter 23 translates only one BC 22 instruction at a time, producing a specific MC 24 instruction for the computer hardware to execute. However, since the interpreter method of processing is a common knowledge, it is fairly easy to read, understand, and modify the BC 22 which is an instruction set for interpreter 23. A hacker may buy a legal copy of a code written in BC, decipher its instructions and erase or modify some of the original instructions of the BC. Once the BC has been modified, it can be mass copied and resold.

Another method used by hackers is known in the art as "runtime data interception". By intercepting and reading the data flow during the execution of a legal program by the interpreter, the hacker can simulate the process when executing an illegal program.

One method for preventing easy understanding and deciphering of the code behavior utilizes encryption of the code, as described in US 2004/0015710. According to this approach, the encrypted code is sold with a decryption key for decrypting the code. Each instruction in the code is first decrypted and interpreted by an interpreter for execution by the processor. However, once the code has been decrypted, a hacker may read the decrypted code to reverse engineer the original code. Furthermore, the decryption process may be monitored by a user for formulating the decryption key. In addition, once the code is decrypted, it is loaded unprotected into the memory of the computer and may be copied from there, as well.

Another method for preventing modification of a software code is splitting the code into 2 parts, a sensitive part comprising the code protection, and a less sensitive part. The less sensitive part of the code is sold to the user, as before, ready for interpretation, whereas the sensitive part of the code is stored on hardware products, such as smart-cards. The interpretation of the sensitive part of the code is done in hardware, such as a smart-card reader, where it cannot be monitored or read. However, in some of the cases, the additional hardware may be expensive, and redistribution of code updates generated by the provider is complicated.

A method for preventing modification of a software code is described in a paper by Enriquillo Valdez and Moti Yung "DISSECT: Distribution for SECurity Tool" (G.I.Davida and Y.rankel (Eds.):ISC 2001, LNCS 2200, pp. 125-143, 2001. Springer-Verlag Berlin Heidelberg 2001). The method suggests splitting the code into 2 parts, a sensitive part and a less sensitive part. The less sensitive part of the code is sold to the user, as before, ready for interpretation, whereas the sensitive part of the code is stored on a secured server. The interpretation of the sensitive part of the code is done on a secured server, where it cannot be monitored or read. However, this approach requires maintaining a direct contact to the designated server for executing the code.

It is therefore an object of the present invention to provide an inexpensive method for preventing software reverse engineering, unauthorized modification, and runtime data interception.

It is another object of the present invention to provide a method for preventing unauthorized modification of software, without needing additional hardware.

It is still another object of the present invention to provide a method that on one hand, prevents any modification by an unauthorized user and on the other hand, allows modification and update by the vendor.

Other objects and advantages of the invention will become apparent as the description proceeds.

SUMMARY OF THE INVENTION

The present invention is directed to a method for preventing the unauthorized modification of a software or unauthorized modification of runtime data. A converter, capable of converting the software into a generalized machine code that cannot be reversed engineered, by using a conversion process that causes data loss and an interpreter that may be compiled by a CLR, are provided. The knowledge of the interpreter's process method is kept restricted. The general machine code is interpreted by the interpreter into a specific machine.

The software may be a high level language (e.g., Java, Visual J#, J#, C#, or VB.NET or a compiler based language, e.g., C++, VB, or Pascal), such as an interpreter based language, and may be divided such that only part of the software is converted with the converter and interpreted by the interpreter.

The data loss during conversion may be the removal of code structure metadata or the conversion of instructions to other instructions which their corresponding operand(s) is determined during runtime.

DETAILED DESCRIPTION OF PREFERRED EMBODIMENTS

Figure 1:
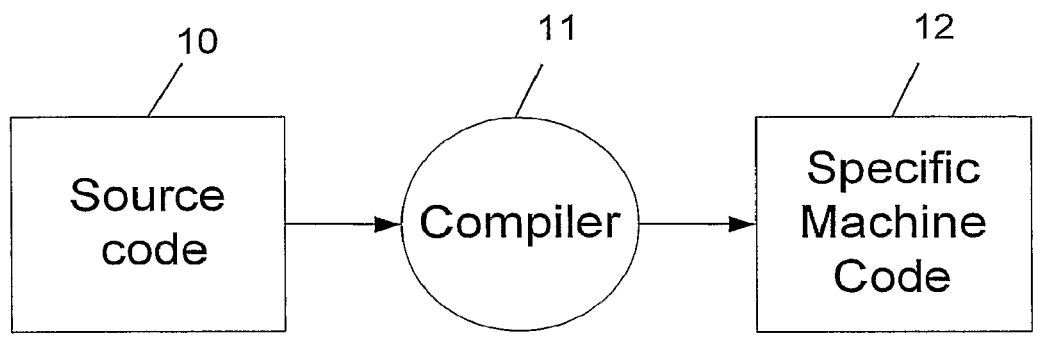
FIG. 1 is a flow chart generally illustrating the prior art software process of compiler based programming languages.
Figure 2A:
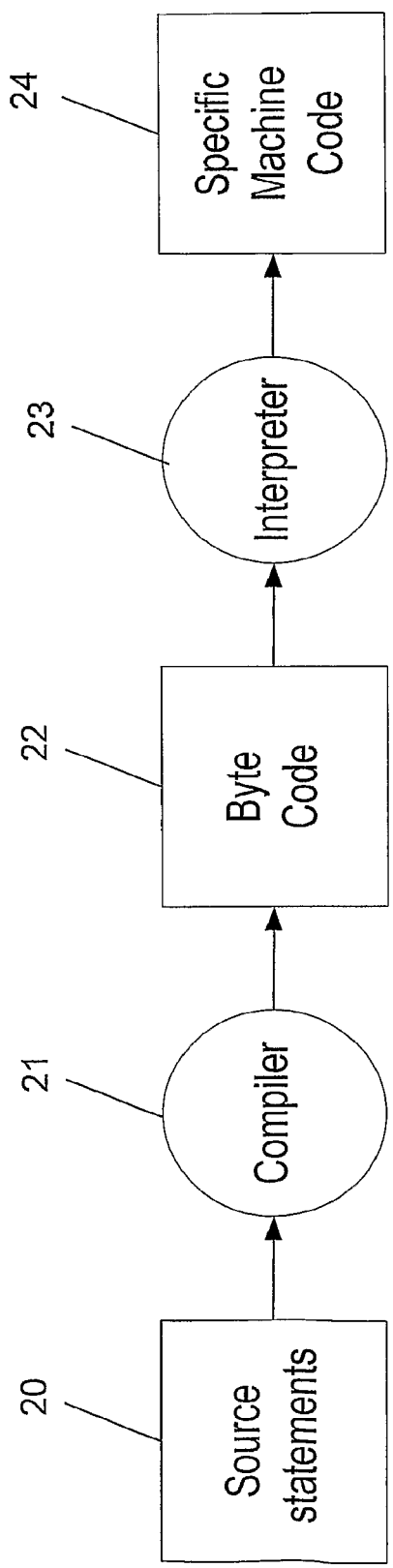
FIG. 2a is a flow chart generally illustrating the prior art software process of interpreter based programming languages.
Figure 2B:
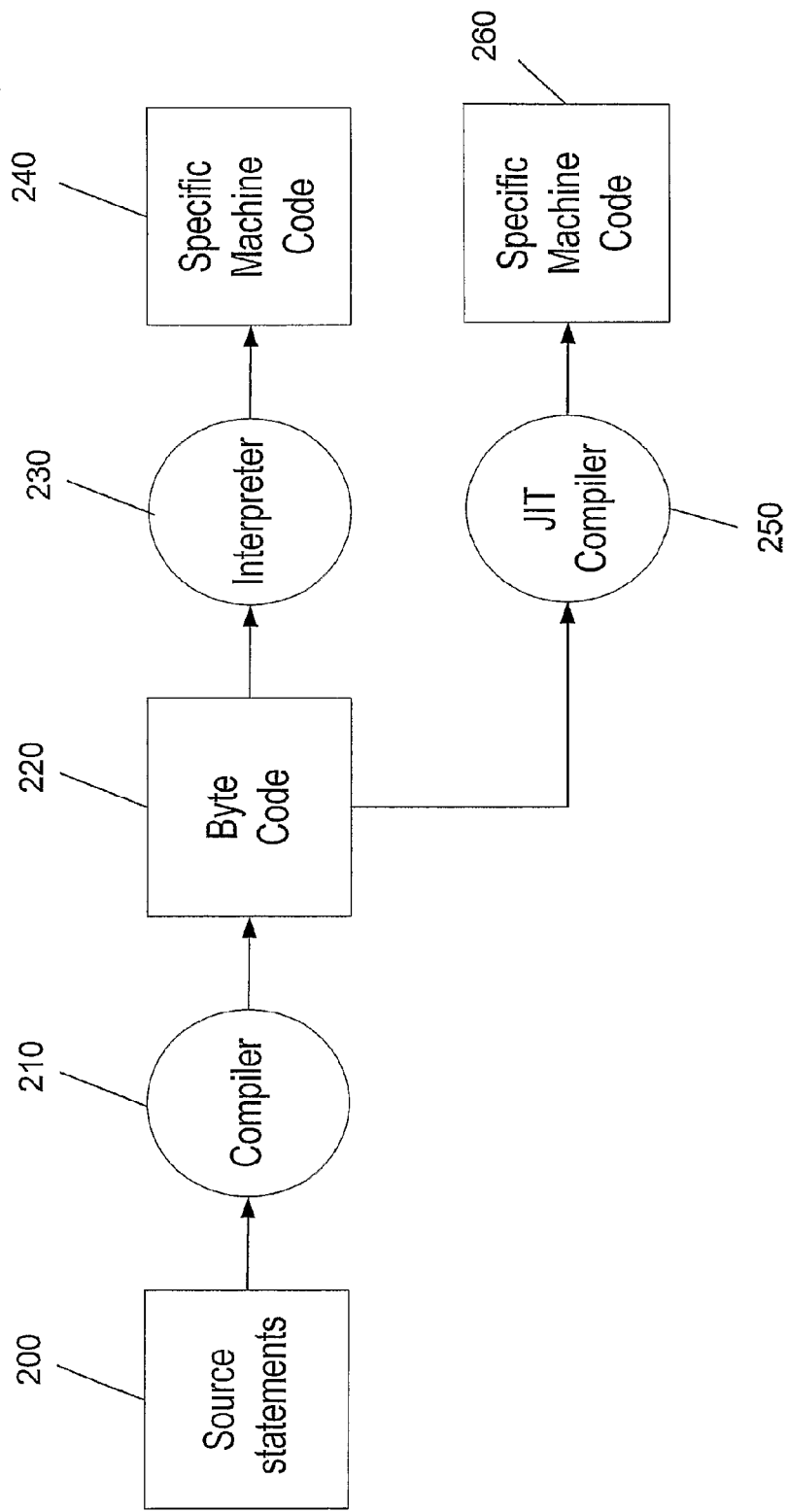
FIG. 2b is a flow chart generally illustrating the prior art software process of interpreter based programming languages, mainly JAVA.

For the sake of brevity, the following terms are defined explicitly:
A platform is the computer's operating system which is built on the instruction set for the computer's processor, the hardware that performs logic operations and manages data movement in the computer.
Machine Code (MC) is the code which can be read and executed directly by the computer's processor.
Specific Machine Code is the code which can only be read and executed by a specific platform, or a number of specified platforms.
Generalized Machine Code is the code which is not limited to a specific platform.
A compiler converts a set of instructions into a machine code.
Description of Well Known Processes
FIG. 2b is a flow chart generally illustrating the prior art software process of interpreter based programming languages, such as JAVA. Similar to the compiler based programming languages, the interpreter based languages are written in high level language, using an editor or the like, referred to hereinafter as source statements 200. According to this approach, the compiler 210 translates the high level source statements 200 to a Byte Code (BC) 220, which is a generalized MC that is not limited to a certain platform. Nevertheless, in order to execute the BC 220, a specific interpreter 230 is needed to translate BC 220 into a specific MC 240. The specific interpreter 230 is usually installed along with the operating system. The main advantage of this approach is that BC 220 may be distributed for different platforms. Once. BC 220 is executed on a certain platform, the specific interpreter 230 translates one BC command at a time, thereby producing a specific MC command for the computer hardware to execute. When dealing with Sun Microsystems® Java, BC 220 is called Java Byte Code and the interpreter 230 is called a Virtual Machine (VM). In some cases, the VM comes together with a Just-in-time compiler 250 and is used optionally. The Just-in-time compiler 250 compiles Java BC 220 into a specific MC 260 as if the program had been compiled initially for that specific program. In both cases of VM 230 and Just-in-time compiler 250, the computer hardware reads its intended specific MC. However, since interpreter 230 translates one BC 220 command at a time during execution, it may run slower on the computer.

The Java VM, which operates as an interpreter between Java BC and a specific MC, is individual for each platform. Once a Java VM has been provided for a platform, any compiled Java BC may be run on that platform. Therefore, when a user has a Java VM installed on his computer, he may acquire any program in Java BC, and execute it on his computer. When a programmer programs in Java and compiles the program into a Java BC, he may distribute the Java BC widely to any user, as the Java BC is compatible for all popular platforms. The Java VM is responsible for allocating memory, setting registers, stack, "garbage" heap, and method area (method area of a Java VM is a logical area of memory which stores all the information about the loaded types), for the program execution.

Figure 3:
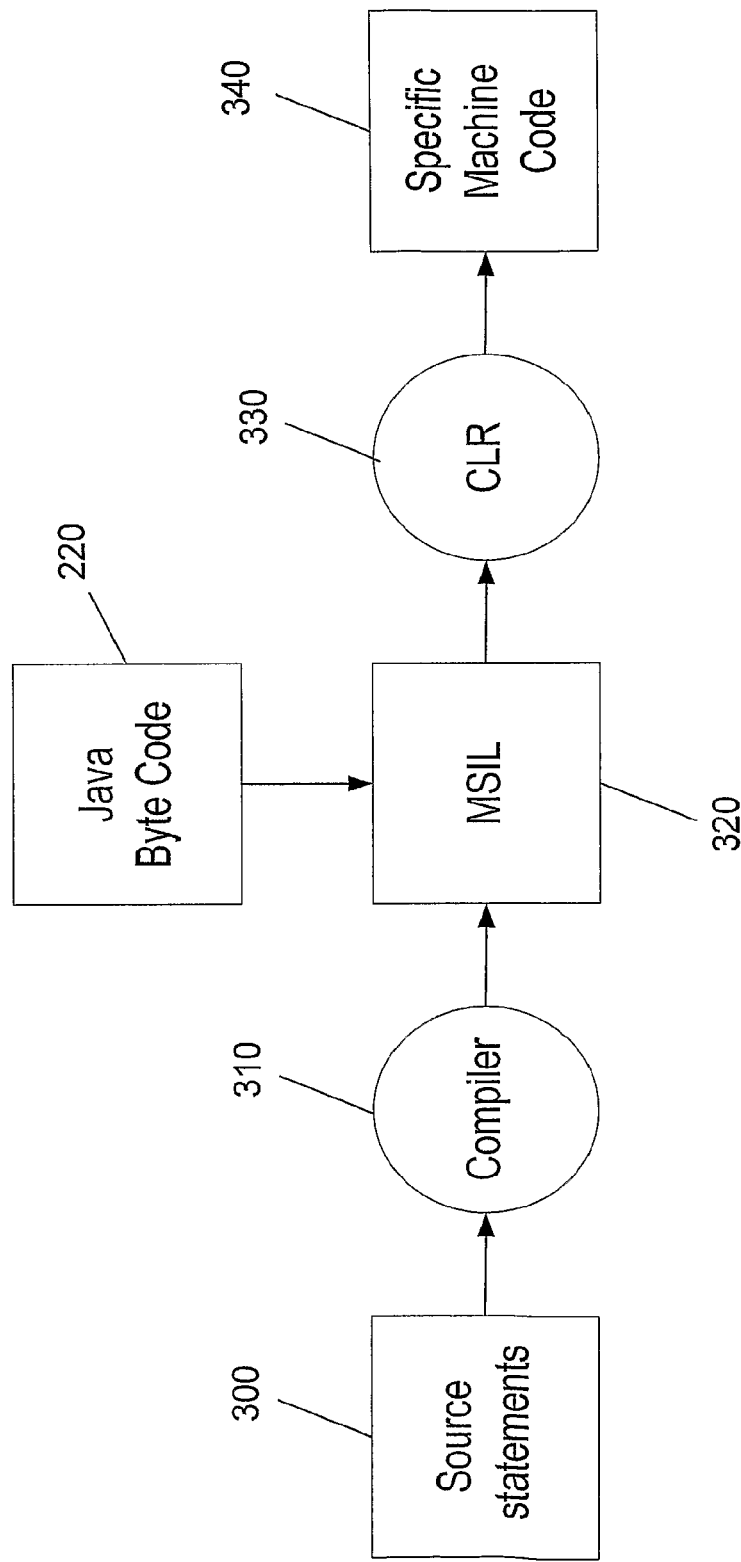
FIG. 3 is a flow chart generally illustrating the prior art software process of programming languages of .NET, such as Visual J#.

FIG. 3 is a flow chart generally illustrating the prior art software process of programming languages which are designed to run on Microsoft®.NET, such as Visual J#. Generally speaking, the .NET environment allows the use of the Web resources rather than the computer resources for various services. Visual J# or J# allows programmers to program in "similar to Java" language and run the program on .NET. The source statements 300, written in Visual J# high level language, are compiled by compiler 310 into Microsoft Intermediate Language (MSIL) 320, which is a general MC that is not limited to a specific platform. The MSIL 320 is equivalent to the Java BC 220 in its functions, and the Java BC 220 can even be converted easily to MSIL 320. Similar to the process described above, the MSIL 320 is converted to a specific MC 340 using Common Language Runtime (CLR) 330, which is equivalent to the function of JAVA VM 230. As understood, other .NET programming languages such as C# and VB.NET undergo a similar process from sources statements 300 to MSIL 320 to specific MC 340.

It should be noted that the memory allocations of the described VM and CLR is widely known to hackers, such as the setting of the registers, stack, "garbage" heap, and method area of the program. Using this information, the hacker can understand which commands of the Java BC or MSIL refer to the requirement of license and modify these commands.

A .NET metadata in the Microsoft .NET framework describes the .NET CIL (Common Intermediate Language) code. A .NET language compiler will generate the metadata and store this in the assembly containing the CIL. The metadata describes all classes and class members that are defined in the assembly, and the classes and class members that the current assembly will call from another assembly. The metadata for a method contains the complete description of the method, including the class (and the assembly that contains the class), the return type and all of the method parameters. When the CLR executes CIL, it verifies that the metadata of the called method is the same as the metadata that is stored in the calling method. This ensures that a method can only be called with exactly the right number of parameters and exactly the right parameter types. Therefore, in environments like .NET and Java it is easier to reverse engineer the code as the code and metadata are provided together as part of the redistributable package. The metadata is necessary for Just-In-Time compilation of code to the target platform. However, in compiler-based languages such as C++, the metadata is dropped during the compilation and link stages and it is not redistributed to end users.

General Description of the Invention

The essence of the invention is an interpreter, which its method of operation and memory allocations are unpublicized. The new unrevealed interpreter or "Secret VM", is referred to hereinafter as SVM. Each SVM is paired with a correlated converter, or in other words, each SVM may only interpret a code that has been produced by a correlated converter. Therefore, each vendor of original software that requires software protection may purchase an exclusive correlated pair of converter and SVM. The methods of operation, such as instruction encoding or memory allocations, may vary between different SVMs.

Figure 4:
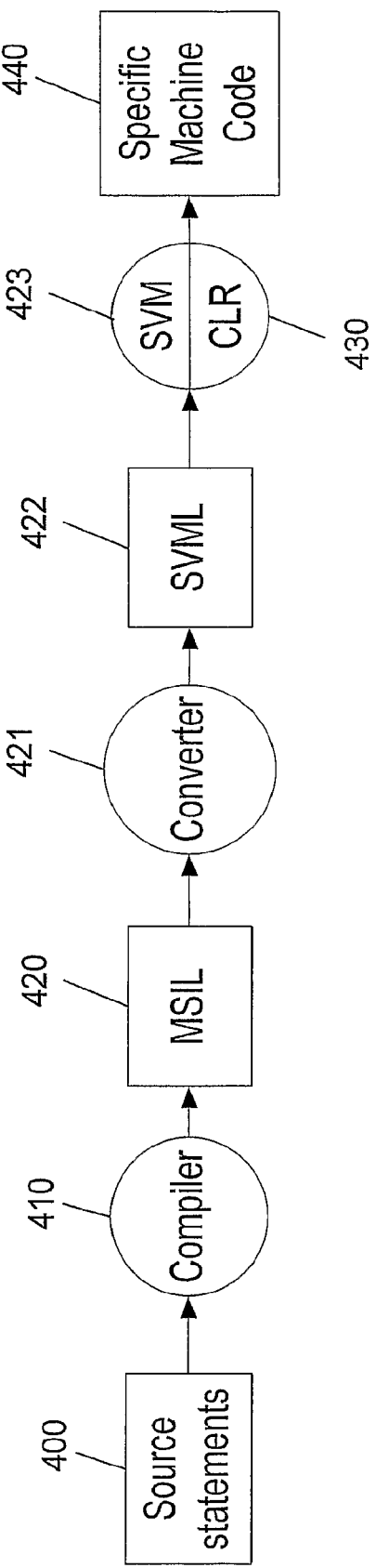
FIG. 4 is a flow chart generally illustrating the implementation of the invention according to one of the embodiments.

FIG. 4 illustrates an implementation of the invention according to one of the embodiments, where the source statements 400 are written in high level programming language of .NET. Compiler 410 compiles source statements 400 into MSIL 420 as described in the prior art. At this point, converter 421 is used to convert MSIL 420 into a Secret Virtual Machine Language (SVML) 422. The SVML 422 is a general MC, not limited to a certain platform. However, the commands of the SVML 422 are different from the known general MCs commands such as the Java BC or MSIL 420 commands. Therefore, deciphering of the SVML 422 is exceptionally complicated, since no known disassembler or debugger exists for SVML 422. The SVML 422 may be distributed together with the corresponding SVM 423. The SVM 423 is compiled on the designated computer using the local CLR 430 for adding the data concerning the Specific platform of the designated computer. Since the SVM 423 performs as an interpreter, it comprises not only new data for interpreting SVML 422, but also data concerning the platform profile from CLR 430. Thus, when SVML 422 is executed on the designated computer, SVM 423 interprets each command to the hardware for execution. Since the SVM 423 method of processing is unknown, a hacker will find it difficult to understand and modify the code, or to try intercepting the data during runtime.

General Description of the Proposed Converter's Attributes

One of the designated attribute of the converter involves the producing of different SVML programs for the same MSIL input (otherwise known as "code morphing"). The code morphing relies on a redundancy in the SVML instruction set, for example, SUB instruction can be replaced by NEG and ADD instructions. This attribute is mostly effective for preventing attempts to compare the MSIL instructions set with the equivalent SVML instructions set. This attribute relies on a redundancy in the SVML instruction set, for example, SUB instruction can be replaced by NEG and ADD instructions.

I. Another designed attribute of the converter is the possibility of dynamic encoding of instructions, meaning the changing of corresponding bit pattern, or code, of a certain instruction. As opposed to the MSIL, where same instructions are expected to be encoded similarly, in SVML the same instruction may appear in different codes. For example, the instruction may be encoded with its address as shown in the following tables:

| Instruction address | MSIL Instruction | Code |
| --- | --- | --- |
| 70 | ADD | 20 |

| Instruction address | SVML Instruction | Code |
| --- | --- | --- |
| 70 | ADD | 20 + 70 = 90 |
| 74 | ADD | 20 + 74 = 94 |

Therefore, even if a hacker might try to find repeating patterns in an SVML code to deduce common instructions, he will find it more complicated than assumed.

II. The main designed attribute of the converter is the causing of data loss during conversion for making the conversion process practically irreversible. One example of data loss is the removal of code structure metadata, such as method declarations, since in .NET it is not required when a method is called only by other transformed methods. Additional example of data loss is the following: a widely known instruction set comprises the following instructions: ADD_INT8, ADD_INT16, and ADD_INT32. These instructions instruct the processor to add the numbers of 8, 16, or 32 bits accordingly. During the process of conversion, using the unique converter, all these instructions are converted to open instructions "ADD". The type of operand and number of bits, which should be added (8, 16, or 32) is determined during runtime. Therefore, reverse compilation is impossible without knowing the number for adding in the "ADD" instruction. Since the conversion process is irreversible, the code cannot be converted back to a standard MSIL/Java BC format, and therefore it cannot be decompiled, disassembled, debugged or modified using standard tools.

Example of SVM Architecture and Corresponding SVML Instruction Set

Figure 5:
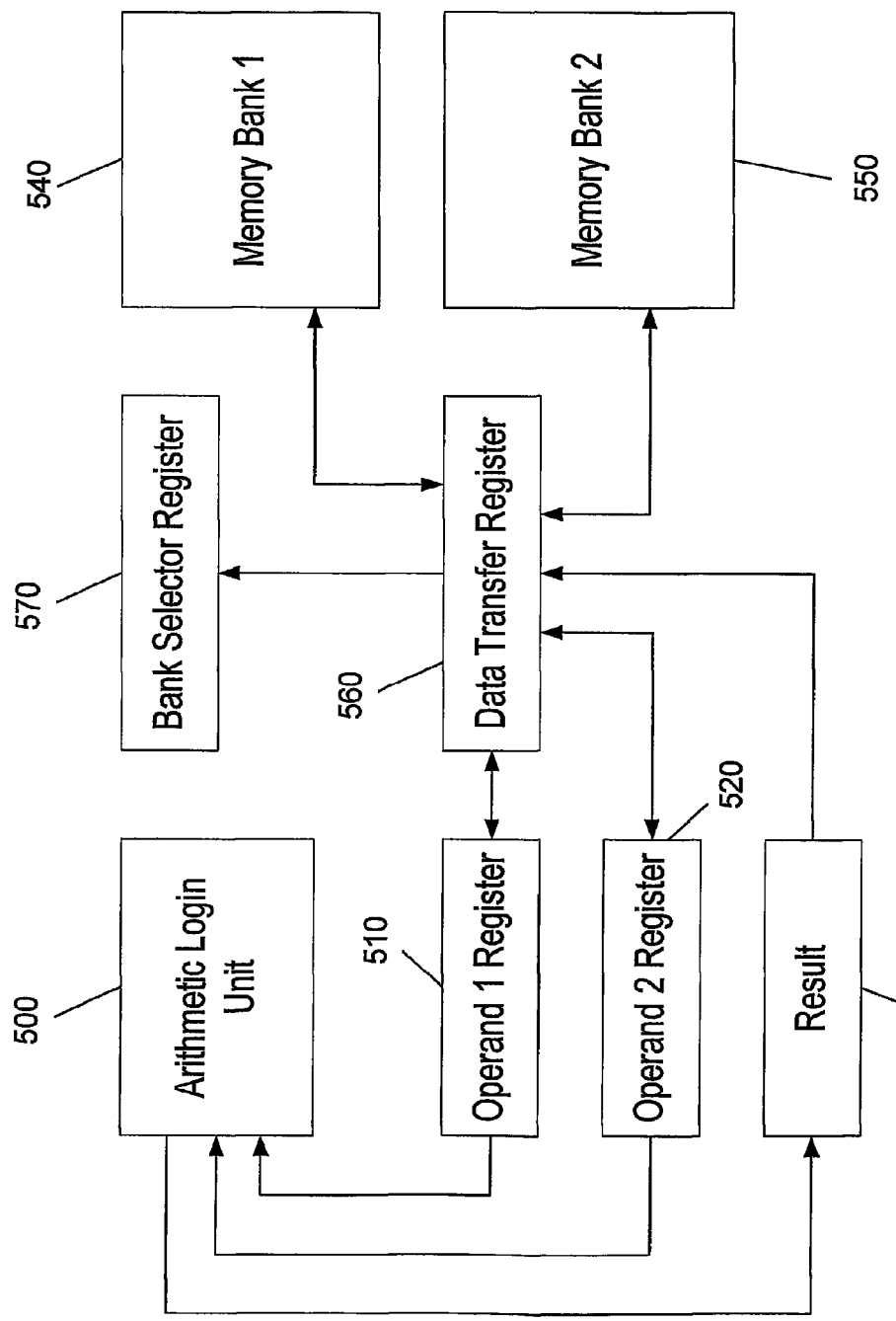
FIG. 5 is a block diagram illustrating one of the embodiments of the invention.

FIG. 5 is a block diagram illustrating an example of SVM architecture, according to one of the embodiments. Arithmetic Logic Unit 500 performs the logic operations on operand registers 510 and 520, and stores the result in register 530. Data transfer register 560 is used for transferring data between registers and Memory Banks 540 and 550. Memory Banks 540 and 550 are used for storing local variables and method parameters. The bank selector register 570 stores the number of Memory Bank in use.

An example of a subset of instructions of SVML and their meaning:

| SVML Instruction | Description |
| --- | --- |
| MEM2TRANSFER | Copies contents of memory address specified to Data Transfer Register 560 |
| SETMBANK1 | Sets Bank Selector Register 570 to 1 |
| SETMBANK2 | Sets Bank Selector Register 570 to 2 |
| TRANSFER2MEM | Copies contents of Data Transfer Register 560 to memory address specified |
| TRANSFER2OP1 | Copies contents of Data Transfer Register 560 to Operand Register 510 |
| TRANSFER2OP2 | Copies contents of Data Transfer Register 560 to Operand Register 520 |
| RESULT2TRANSFER | Copies contents of Result Register 530 to Data Transfer Register 560 |
| ADD | Performs the addition arithmetic operation on Operand 1 and Operand 2 registers and stores the result in Result Register 530 |
| SUB | Performs the subtract arithmetic operation on Operand 1 and Operand 2 registers and stores the result in Result Register 530 |

Comparison Between a General MC Code and SVML Code

For the sake of brevity a non limitative example is shown herein below comparing an assembly program code of prior art general MC to that of the SVML. In both cases, the given task required processing the equation 4+3−1.

A general MC program code processing equation 4+3−1:
LDC 4
LDC 3
ADD
LDC 1
SUB

An SVML program code processing equation 4+3−1:

| | |
| --- | --- |
| SETMBANK1 | selects memory bank 1 |
| MEM2TRANSFER 23 | loads "4", a constant stored at memory address 23 |
| TRANSFER2OP1 | move value "4" to operand 1 register |
| MEM2TRANSFER 45 | loads "3", a constant stored at memory address 45 |
| TRANSFER2OP2 | move value "3" to operand 2 register |
| ADD | Add contents of operand 1 and 2 registers |
| RESULT2TRANSFER | move the result "7" to transfer register |
| TRANSFER2OP1 | move the value "7" to operand 1 register |
| MEM2TRANSFER 12 | Load "1", a constant stored at memory address 12 |
| TRANSFER2OP2 | move value "1" to operand 2 register |
| SUB | subtract the content of operand 2 from operand 1 |
| RESULT2TRANSFER | move the result to transfer register |
| TRANSFER2MEM 1 | store the result at memory address 1 |

As shown in the program code above, the processed operands (4, 3, and 1) are never depicted explicitly in the instructions. A hacker trying to reverse engineer the program cannot deduct from the present set of instructions what are the values of operands in the equation, as each value is read from memory during runtime.

Additional Embodiments of the Invention

In one of the embodiments, each vendor is equipped with his own pair of converter and SVM. Therefore, knowing the method of process of one SVM does not reveal the method of process of other SVMs.

The method proposed by the present invention may be used with any interpreter based language. For example, for J# of .NET the SVM is compiled by the CLR, for JAVA the SVM is compiled by the VM, and so on. The proposed invention may be used for any software whether a high level language such as C# or VB.NET, a software code, a source code or a machine code.

Figure 6:
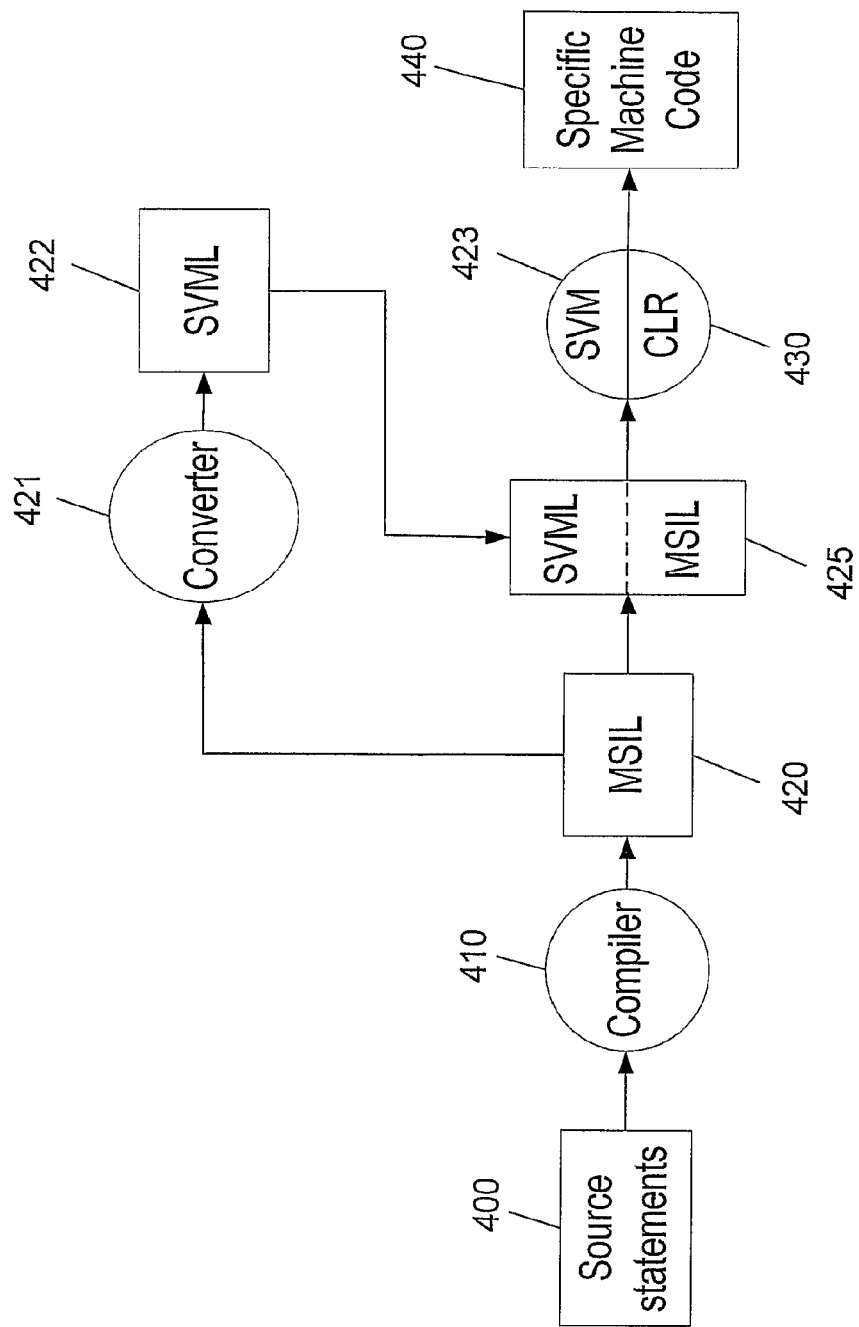
FIG. 6 is a flow chart generally illustrating the implementation of the invention according to another embodiment of the invention.

FIG. 6 illustrates an example of another embodiment of the invention, where the source statements 500 are written in high level language, such as Visual J#. Compiler 410 compiles source statements 400 into MSIL 420 as described before. However, before conversion, the MSIL 420 instructions are divided into two groups, sensitive instructions, which may include the license requirements, and insensitive instructions. The sensitive instructions are converted by converter 421 into SVML 422, whereas the insensitive instructions are not converted. The general MC 425, or program, which consists of a part MSIL and a part SVML, may be distributed together with the corresponding SVM 423 to any popular platform. In order to execute the program, SVM 423 is compiled by CLR 430 on the designated platform. During execution, each instruction is examined for compatibility with MSIL 420 or SVML 422. The MSIL 420 instructions are interpreted directly by CLR 430, whereas SVML 422 instructions are interpreted by SVM 423.

Figure 7:
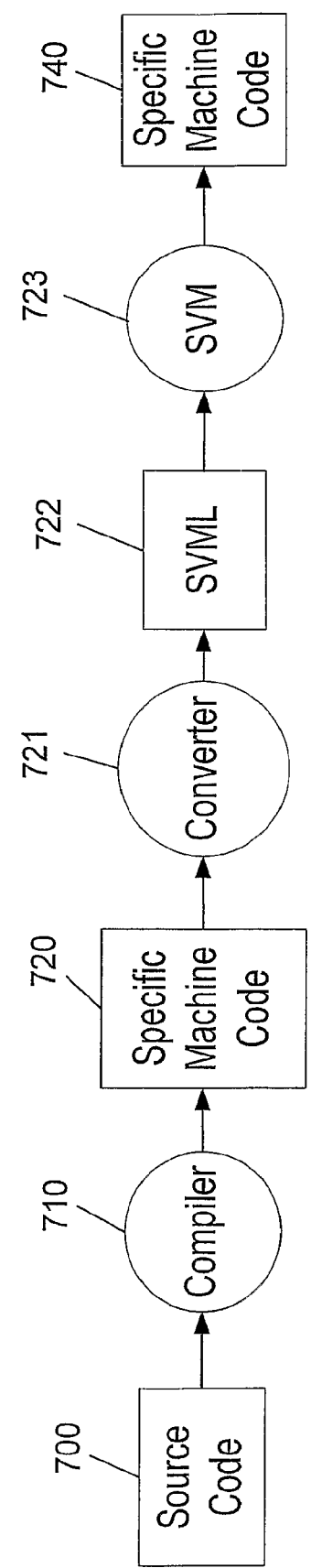
FIG. 7 is a flow chart generally illustrating the implementation of the invention according to one of the embodiments, for compiler based programming languages.

FIG. 7 illustrates an implementation of the invention, according to one of the embodiments, for compiler based programming languages. As described in the background, the source code 700 is compiled by compiler 710 into specific MC 720. The specific MC 720 is converted using a designated converter 721 into an SVML 722, where the SVML 722 is platform dependant, or in other words it is a specific MC. The SVML 722 is distributed with an SVM 723 designed for the specific platform of the SVML 722. Since the distributed SVM 723 is already specified for a designated platform, it does not require compilation on the designated computer. Therefore, the SVM 723 is capable of translating the SVML 722 into specific MC 740, for the hardware of designated computer.

In another embodiment for compiler based programming languages, only the sensitive instructions are converted by converter 721 into SVML 722. The SVML 722 is distributed with the SVM 723 and the remaining instructions of specific MC 720. During execution the SVM 723 executes the instructions of the SVML 722.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for preventing unauthorized modification of a software or unauthorized modification of runtime data, comprising:
   providing a converter capable of converting the software into a generalized machine code, that cannot be reverse engineered, by using a conversion process that causes data loss;
   providing an interpreter, wherein knowledge of the interpreter's process method is kept restricted, wherein the interpreter is implemented as an interpreter-based programming language software component for maintaining the same level of portability as the software, and wherein the interpreter is formed by choosing a complete instruction subset out of a redundant instruction set, and by dynamically generating the converter and the interpreter implementation; and
   interpreting, by the interpreter, the generalized machine code into a specific machine code while reconstructing the data lost during the conversion process.

2. The method of claim 1, wherein the interpreter is compiled by a Common Language Runtime (CLR).

3. The method of claim 1, wherein the software is divided such that a portion of the software is converted by the converter and interpreted by the interpreter.

4. The method of claim 1, wherein the software is implemented using a high level programming language.

5. The method of claim 4, wherein the high level programming language is an interpreter-based programming language.

6. The method of claim 5, wherein the high level programming language is any one of the following: Java, Visual J#, J#, C#, or Visual Basic.NET.

7. The method of claim 4, wherein the high level programming language is a compiler-based programming language.

8. The method of claim 7, wherein the high level programming language is any one of the following: C++, Visual Basic, or Pascal.

9. The method of claim 1, wherein the data lost during the conversion process comprises code structure metadata removed during the conversion process.

10. The method of claim 1, wherein the data lost during the conversion process is a conversion of instructions to other instructions which their corresponding operand(s) is determined during runtime.

11. A computer-readable medium, excluding signals, storing executable instructions that, when executed by a processor, prevent unauthorized modification of a software or unauthorized modification of runtime data, the computer-readable medium storing the executable instructions executable by the processor to:
   provide a converter capable of converting the software into a generalized machine code, that cannot be reverse engineered, by using a conversion process that causes data loss;
   provide an interpreter, wherein knowledge of the interpreter's process method is kept restricted, wherein the interpreter is implemented as an interpreter-based programming language software component for maintaining the same level of portability as the software, and wherein the interpreter is formed by choosing a complete instruction subset out of a redundant instruction set, and by dynamically generating the converter and the interpreter implementation; and
   interpret, by the interpreter, the generalized machine code into a specific machine code while reconstructing the data lost during the conversion process.

12. The computer-readable medium of claim 11, wherein the interpreter is compiled by a Common Language Runtime (CLR).

13. The computer-readable medium of claim 11, wherein the software is divided such that a portion of the software is converted by the converter and interpreted by the interpreter.

14. The computer-readable medium of claim 11, wherein the software is implemented using a high level programming language.

15. The computer-readable medium of claim 14, wherein the high level programming language is an interpreter-based programming language.

16. The computer-readable medium of claim 14, wherein the high level programming language is a compiler-based programming language.

17. The computer-readable medium of claim 14, wherein the high level programming language is any one of the following: Java, Visual J#, J#, C#, C++, Visual Basic, Visual Basic.NET, or Pascal.

18. The computer-readable medium of claim 11, wherein the data lost during the conversion process comprises code structure metadata removed during the conversion process.

19. The computer-readable medium of claim 11, wherein the data lost during the conversion process is a conversion of instructions to other instructions which their corresponding operand(s) is determined during runtime.

* * * * *